US000001997B1

(19) United States

(12) Statutory Invention Registration (10) Reg. No.: US H1997 H

Fleischer (43) Published: Oct. 2, 2001

(54) APPARATUS AND METHOD OF CONCOMITANT SCENARIO TOPOGRAPHY WITH THE AID OF A DIGITAL COMPUTER

(75) Inventor: Peter Fleischer, Christian, MS (US)

(73) Assignee: The United States of America as represented by the Secretary of the Navy, Washington, DC (US)

(21) Appl. No.: 08/791,433

(22) Filed: Jan. 27, 1997

(51) Int. Cl.[7] ..... G01V 3/38; G06F 19/00

(52) U.S. Cl. ..... 702/5

(58) Field of Search ..... 702/5; 434/150, 434/152, 153

(56) References Cited

U.S. PATENT DOCUMENTS

| | | | | |
|---|---|---|---|---|
| 4,538,229 | | 8/1985 | Baltzer et al. . | |
| 5,015,844 | | 5/1991 | Cole . | |
| 5,173,691 | | 12/1992 | Sumner . | |
| 5,187,667 | | 2/1993 | Short . | |
| 5,798,923 | * | 8/1998 | Laskowski | 702/5 |
| 5,839,090 | * | 11/1998 | Zoraster | 702/5 |

OTHER PUBLICATIONS

IMCO/FAO/WMO/WHO/IAEE/UN/UNEP Joint Group of Experts on the Scientific Aspects of Marine Pollution—GESAMP—, *Reports and Studies*, No. 16, "Scientific Criteria for the Selection of Waste Disposal Sites at Sea", IMCO 1982.

"An Abyssal Ocean Option for Wate Management", Report of Workshop held at The Woods Hole Oceanographic Institution, Jan. 7–10, 1991, p. 1–111.

Report NRL/MR/7401—95–7576, Naval Research Laboratory, Stennis Space Center, MS, *Abyssal Seafloor Waste Isolation: Environmental Report*, ed. Valent et al., cover date of Sep. 29, 1995, pp. i–vii, 133–188, 460–475.

* cited by examiner

*Primary Examiner*—Daniel T. Pihulic

(74) *Attorney, Agent, or Firm*—Barry A. Edelberg

(57) ABSTRACT

A system for concomitant scenario topography with the aid of a digital computer such that a two-dimensional or three-dimensional map is produced and displayed which illustrates the combined effects, particularly geo-environmental, of multiple, diverse criteria and factors relative to uniquely-referenced, uniform, small areas of a plane surface or the surface of a solid. The topography system employs plural interrelated tables, worksheets and mapping systems to receive, contain and apply various political, economic, scientific, and technical criteria and factors as attributes of a particular small area, and subsequently map the processed data. Each table includes at least one join field which links that table to at least one other table or worksheet. At least one worksheet includes capability for rapid, dynamic user-interaction to facilitate generation of a myriad of actual or imagined scenarios.

20 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FACTOR WEIGHTING TABLE

*Partial View and Examples (Interactive screen display)*

| No. | Criterion | No. | Factor | weight | % factor weight |
|---|---|---|---|---|---|
| | | 1-99 | Scorable | weight sum = 100 | % sum = 100.00 |
| | | 101-199 | Exclusion | | |
| | | 201-299 | Fixed score | any number, or e = excluded | |
| --- | Testing/display | 0 | Uniform-value | 0 | 0.00 |
| A | Definition | 101 | 1000 nm limit | e | none |
| B | Unique environments | 104 | A: Bahama Platform | e | none |
| C | Anthropogenic | 1 | HITS 1° ship density | 5 | 5.00 |
| D | Geologic | 2 | Max. slope, ° / 5'x5' square | 7 | 7.00 |
| " | " | " | " | " | " |
| G | Oceanographic | 21 | Layer 6 bottom current speed | 9 | 9.00 |
| " | " | " | " | " | " |
| H | Distance | 201 | NWA_New York | 0 | 0.00 |
| " | " | " | " | " | " |

*FIG. 3*

FACTOR CATEGORY SCORING TABLE

*Partial View and Examples* *(Interactive screen display)*

| No. | Factors / Categories | % factor weight | Value (for information only) | Category Scores | Weighted Factor Scores |
|---|---|---|---|---|---|
| | Total no. of factors = 41 | Total % = 100.00 | May use for single-factor plots | 1 - 5 (5 = best) | (- no.) = excl. |
| | No. of scorable factors = 21 | | E = excluded | (1 = worst) -1000 = excl. | |
| 0 | **Uniform-value** | 0.00 | 1 | 3 | 0.00 |
| 101 | **1000 nm limit** | *none* | E | *none* | -1000.00 |
| 104 | **Bahama Platform (WNA)** | *none* | E | *none* | -1000.00 |
| 1 | **HITS 1° ship density** | 5.00 | | | |
| | <1 (<0.8 in GOM) | | 1 | 5 | 0.25 |
| | 1-2 (0.8-2 in GOM) | | 2 | 3 | 0.15 |
| | >2 | | 4 | 2 | 0.10 |
| | 2-4 (GOM) | | 4 | 1 | 0.05 |
| | >4 (GOM) | | 8 | -1000 | -50.00 |
| 2 | **Max. slope, ° / 5'x5'** | 7.00 | | | |
| | <0.25° | | 0.25 | 5 | 0.35 |
| | 0.25-<1° | | 1 | 3 | 0.21 |
| | 1-<5° | | 5 | 2 | 0.14 |
| | >5° | | 16 | 1 | 0.07 |
| 21 | **Layer 6 bottom current speed** | 9.00 | | | |
| | 0-0.25 cm/sec | | 1 | 5 | 0.45 |
| | 0.25-0.5 | | 2 | 4.5 | 0.40 |
| | 0.5-1 | | 3 | 4 | 0.36 |
| | 1-2 | | 4 | 3 | 0.27 |
| | 2-4 | | 5 | 2 | 0.18 |
| | 4-8 | | 6 | 1 | 0.09 |
| 201 | **WNA-New York, distance** | 0.00 | *linear decr. from port* | *formula* | 0.00 |

*FIG. 4*

| lat/lon | 97.5 | 96.5 | 95.5 | 94.5 | 93.5 | 92.5 | 91.5 | 90.5 | 89.5 | 88.5 | 87.5 | 86.5 | 85.5 | 84.5 | 83.5 | 82.5 | 81.5 | 80.5 |
|---|---|---|---|---|---|---|---|---|---|---|---|---|---|---|---|---|---|---|
| 30.5 | | | | | | | | | 85 | 95 | 105 | 115 | | | | | | |
| 29.5 | | | | 29 | 41 | 53 | 64 | 75 | 86 | 96 | 106 | 116 | 125 | 133 | 141 | | | |
| 28.5 | 1 | 9 | 19 | 30 | 42 | 54 | 65 | 76 | 87 | 97 | 107 | 117 | 126 | 134 | 142 | 148 | | |
| 27.5 | 2 | 10 | 20 | 31 | 43 | 55 | 66 | 77 | 88 | 98 | 108 | 118 | 127 | 135 | 143 | 149 | | |
| 26.5 | 3 | 11 | 21 | 32 | 44 | 56 | 67 | 78 | 89 | 99 | 109 | 119 | 128 | 136 | 144 | 150 | 154 | |
| 25.5 | 4 | 12 | 22 | 33 | 45 | 57 | 68 | 79 | 90 | 100 | 110 | 120 | 129 | 137 | 145 | 151 | 155 | 158 |
| 24.5 | 5 | 13 | 23 | 34 | 46 | 58 | 69 | 80 | 91 | 101 | 111 | 121 | 130 | 138 | 146 | 152 | 156 | 159 |
| 23.5 | 6 | 14 | 24 | 35 | 47 | 59 | 70 | 81 | 92 | 102 | 112 | 122 | 131 | 139 | 147 | 153 | 157 | 160 |
| 22.5 | 7 | 15 | 25 | 36 | 48 | 60 | 71 | 82 | 93 | 103 | 113 | 123 | 132 | 140 | | | | |
| 21.5 | 8 | 16 | 26 | 37 | 49 | 61 | 72 | 83 | 94 | 104 | 114 | 124 | | | | | | |
| 20.5 | | 17 | 27 | 38 | 50 | 62 | 73 | 84 | | | | | | | | | | |
| 19.5 | | 18 | 28 | 39 | 51 | 63 | 74 | | | | | | | | | | | |
| 18.5 | | | | 40 | 52 | | | | | | | | | | | | | |

*FIG. 5*

GULF OF MEXICO *Partial View and Examples (Screen display)*

1° CELL WEIGHTED FACTOR-SCORES AND CELL SCORES

| Lat | Lon | Cell # | SCORE | SCORE | Factor number 0 | 101 | 106-8 | 1 | 2 | 21 | 205 | Distance table, nm |
|---|---|---|---|---|---|---|---|---|---|---|---|---|
| deg | deg | no. | 1 -5 | % | uinfrm | 1K nm | Xcl Fts | HITS | slope | lyr 6 curr | N.O. dist | N. O. |
| 28.5 | -97.5 | **1** | **0** | **0** | 0 | | | 0.25 | 0.35 | 0.269995 | 0 | 419.331 |
| 27.5 | -97.5 | **2** | **0** | **0** | 0 | | | -50 | 0.35 | 0.269995 | 0 | 419.331 |
| 26.5 | -97.5 | **3** | **0** | **0** | 0 | | | 0.25 | 0.35 | 0.269995 | 0 | 445.41 |
| " | " | " | " | " | " | " | " | " | " | " | " | " |
| 27.5 | -95.5 | **20** | **0** | **0** | 0 | | -1000 | -50 | 0.14 | 0.404992 | 0 | 322.678 |
| 26.5 | -95.5 | **21** | **0** | **0** | 0 | | -1000 | 0.05 | 0.14 | 0.404992 | 0 | 354.968 |
| " | " | " | " | " | " | " | " | " | " | " | " | " |
| 25.5 | -93.5 | **45** | **3.65** | **66.25** | 0 | | | 0.15 | 0.14 | 0.449991 | 0 | 323.434 |
| 24.5 | -93.5 | **46** | **3.84** | **71.12** | 0 | | | 0.15 | 0.35 | 0.404992 | 0 | 374.622 |
| " | " | " | " | " | " | " | " | " | " | " | " | " |
| 24.5 | -80.5 | **159** | **0** | **0** | 0 | | -1000 | -50 | 0.14 | 0.179996 | 0 | 605.616 |
| 23.5 | -80.5 | **160** | **0** | **0** | 0 | | | 0.25 | 0.07 | 0.449991 | 0 | 641.523 |

*FIG. 6*

PERCENT SCORES (0=excluded, or 0 score)

| lat/lon | 98.5 | 97.5 | 96.5 | 95.5 | 94.5 | 93.5 | 92.5 | 91.5 | 90.5 | 89.5 | 88.5 | 87.5 | 86.5 | 85.5 | 84.5 | 83.5 | 82.5 | 81.5 | 80.5 | 79.5 |
|---|---|---|---|---|---|---|---|---|---|---|---|---|---|---|---|---|---|---|---|---|
| 31.5 | -18 | -18 | -18 | -18 | -18 | -18 | -18 | -18 | -18 | -18 | -18 | -18 | -18 | -18 | -18 | -18 | -18 | -18 | 0 | 0 |
| 30.5 | -18 | -18 | -18 | -18 | -18 | -18 | -18 | -18 | -18 | 0 | 0 | 0 | 0 | -18 | -18 | -18 | -18 | -18 | 0 | 0 |
| 29.5 | -18 | -18 | -18 | -18 | 0 | 0 | 0 | 0 | 0 | 0 | 0 | 0 | 0 | 0 | 0 | 0 | -18 | -18 | 0 | 0 |
| 28.5 | -18 | 0 | 0 | 0 | 0 | 0 | 0 | 0 | 0 | 0 | 0 | 0 | 0 | 0 | 0 | 0 | 0 | -18 | -18 | 0 |
| 27.5 | -18 | 0 | 0 | 0 | 0 | 0 | 0 | 0 | 0 | 0 | 0 | 0 | 0 | 0 | 0 | 0 | 0 | -18 | -18 | 0 |
| 26.5 | -18 | 0 | 0 | 0 | 0 | 0 | 0 | 0 | 60 | 60 | 0 | 0 | 0 | 0 | 0 | 0 | 0 | 0 | -18 | 0 |
| 25.5 | -18 | 0 | 0 | 0 | 0 | 66 | 66 | 66 | 69 | 69 | 58 | 54 | 67 | 0 | 0 | 0 | 0 | 0 | 0 | 0 |
| 24.5 | -18 | 0 | 0 | 0 | 0 | 71 | 0 | 0 | 0 | 0 | 0 | 0 | 0 | 71 | 58 | 0 | 0 | 0 | 0 | 0 |
| 23.5 | -18 | 0 | 0 | 0 | 0 | 0 | 0 | 0 | 0 | 0 | 0 | 0 | 0 | 0 | 0 | 0 | 0 | 0 | 0 | 0 |
| 22.5 | -18 | 0 | 0 | 0 | 0 | 0 | 0 | 0 | 0 | 0 | 0 | 0 | 0 | 0 | 0 | -18 | -18 | -18 | -18 | -18 |
| 21.5 | -18 | 0 | 0 | 0 | 0 | 0 | 0 | 0 | 0 | 0 | 0 | 0 | 0 | 0 | 0 | 0 | -18 | -18 | 0 | -18 |
| 20.5 | -18 | -18 | 0 | 0 | 0 | 0 | 0 | 0 | 0 | -18 | -18 | -18 | 0 | 0 | 0 | 0 | 0 | 0 | 0 | 0 |
| 19.5 | -18 | -18 | 0 | 0 | 0 | 0 | 0 | 0 | -18 | -18 | -18 | -18 | 0 | 0 | 0 | 0 | 0 | 0 | 0 | 0 |
| 18.5 | -18 | -18 | -18 | -18 | 0 | 0 | -18 | -18 | -18 | -18 | -18 | 0 | 0 | 0 | 0 | 0 | 0 | 0 | 0 | 0 |
| 17.5 | -18 | -18 | -18 | -18 | -18 | -18 | -18 | -18 | -18 | -18 | -18 | 0 | 0 | 0 | 0 | 0 | 0 | 0 | 0 | 0 |

EXAMPLE SCENARIO latitude/longitude at centers of 1° squares

*FIG. 7*

Factor Weighting Table With Example Scenarios

| Criterion | Total wt. percent SCENARIO Isol. | Disp. | Logis. | Factor | Weight percent SCENARIO Isolation | Dispersal | Logistics |
|---|---|---|---|---|---|---|---|
| **Definition** *Excluded or included (e, i)* | | | | >1000 nm from coast | e | e | i |
| | | | | Foreign EEZ | e | e | e |
| | | | | ≤3000 m water depth | e | e | e |
| **Unique Environments** *Excluded or included (e, i)* | | | | WNA: Bahama Platform | e | e | i |
| | | | | WNA: Puerto Rico Trench | e | e | i |
| | | | | GOM: Florida Escarpment | e | e | i |
| | | | | GOM: Campeche Escarpment | e | e | i |
| | | | | GOM: Salt Structures | e | e | i |
| | | | | ENP: East Pacific Rise | e | e | i |
| | | | | ENP: Mendecino Fracture Zn. | e | e | i |
| | | | | ENP: Gorda/Juan de Fuca Rg. | e | e | i |
| **Anthropogenic** | 10 | 10 | 10 | HITS 1° ship density | 5 | 5 | 10 |
| | | | | 1° cable density | 5 | 5 | 0 |
| **Geologic** | 26 | 26 | 0 | Max slope / 5'x5' subsquare | 7 | 7 | 0 |
| | | | | 5'x5' "roughness" (std. dev.) | 3 | 3 | 0 |
| | | | | Sediment accumulation rate | 1 | 1 | 0 |
| | *Treated as exclusionary:* | | | Manganese nodules | 0.001 | 0.001 | 0 |
| | | | | Sediment provinces | 15 | 15 | 0 |
| | *Treated as exclusionary:* | | | Abundant earthquakes | 0.001 | 0.001 | 0 |
| **Biologic** | 20 | 28 | 0 | Benthic oxygen flux | 5 | 7 | 0 |
| | | | | Sediment organic carbon % | 5 | 7 | 0 |
| | | | | Organic carbon burial rate | 5 | 7 | 0 |
| | | | | Benthic biomass | 5 | 7 | 0 |
| **Weather** | 15 | 15 | 40 | Tropical cyclones | 5 | 5 | 20 |
| | | | | Wave height frequency <5 ft | 3 | 3 | 10 |
| | | | | Wave height frequency >12 ft | 7 | 7 | 10 |
| **Oceanographic** | 29 | 21 | 0 | Major currents, locations | 3 | 2 | 0 |
| | | | | 1° eddy density | 5 | 3 | 0 |
| | | | | Surface current speed | 0 | 0 | 0 |
| | | | | Bottom current intensity | 9 | 7 | 0 |
| | | | | Layer 1 surface current speed | 3 | 2 | 0 |
| | | | | Layer 6 bottom current speed | 9 | 7 | 0 |
| **Distance** | 0 | 0 | 50 | Distance weight | 0 | 0 | 50 |
| | | | | *WNA-New York* | *0* | *0* | *50* |
| | | | | *WNA-Norfolk* | *0* | *0* | *0* |
| | | | | *WNA-Charleston* | *0* | *0* | *0* |
| | | | | *WNA-Miami* | *0* | *0* | *0* |
| | | | | *GOM-New Orleans* | *0* | *0* | *50* |
| | | | | *GOM-Galveston* | *0* | *0* | *0* |
| | | | | *ENP-Los Angeles* | *0* | *0* | *50* |
| | | | | *ENP-San Francisco* | *0* | *0* | *0* |
| | | | | *ENP-Seattle* | *0* | *0* | *0* |

*FIG. 12*

APPARATUS AND METHOD OF CONCOMITANT SCENARIO TOPOGRAPHY WITH THE AID OF A DIGITAL COMPUTER

BACKGROUND OF THE INVENTION

1. Field of the Invention

The present invention, disclosed hereinafter, concerns generally a computer-related apparatus and method for quantitatively mapping and displaying, according to certain criteria, sets of categories (i.e. attributes) associated with various, often diverse, criteria-related factors into a visual depiction involving complex topographical scenarios. That is, the present invention is concerned with the detailed mapping and displaying, with the aid of a digital computer, of the features of a uniquely-referenced, relatively small area, district, or locality (i.e. cell), such mapping and displaying of a set of such cells defining a plane surface or surface of a solid, accompanying, existing, or occurring with an imagined or projected sequence of events, especially any of several detailed plans or possibilities. In particular, the present invention provides a method and apparatus for quantitatively and collectively depicting concomitant scenario topography involving various environmental, political, economic, and technical criteria, factors, and categories concurrent with various sites on the abyssal sea floor which subsequently could be considered and evaluated as suitable candidate sites for large-scale national waste disposal.

2. Description of the Related Art

During the latter half of the $20^{th}$ century, disposal of waste materials has rapidly become a complex, exigent problem confronting both the United States and the world. The geometric rate of growth in the world's population and the attendant increase in resource utilization, in conjunction with the rapid industrialization of virtually every modem nation, has generated a waste stream of immense proportions and troublesome content. Current waste management practices are insufficient to resolve the present predicament and a mere continuation of present policy portends, on a global scale, a horrendous future.

An attractive remedy to the waste disposal issue is dumping at sea. The main concern with waste disposal at sea arises from possible deleterious effects on living resources. Such inimical effects on human uses are primarily associated with the accumulation of substances by marine organisms, tainting of sea food, interference with fishing, interference with submarine cable laying and maintenance, and reduction of amenities by discoloration, turbidity and floating materials. The wastes of greatest concern are those which are toxic (particularly at low concentrations), accumulate in organisms, reach the sea in large amounts, and persist there for long periods. The waste disposal at sea issue was extensively explored and debated by the Joint Group of Experts on the Scientific Aspects of Marine Pollution in 1982 at a meeting in London, England and reported in Report and Studies No. 16. This document, "Scientific Criteria for the Selection of Waste Disposal Sites At Sea", Report and Studies No. 16, IMCO/FAO/UNESCO/WMO/WHO/IAEA/UN/UNEP Joint Group of Experts on the Scientific Aspects of Marine Pollution (GESAMP), IMCO, 1982, is incorporated by reference herein for purposes of demonstrating both the infancy of the art and the expressed recognition of a problem of significance and the concomitant need for a remedy or mitigation.

When does dumping at sea become pollution? Marine pollution is an increasingly threatening, global problem; as defined by GESAMP, "Pollution means the introduction by man, directly or indirectly, of substances or energy into the marine environment (including estuaries) resulting in such deleterious effects as harm to living resources, hazards to human health, hindrance to marine activities including fishing, impairment of quality for use of sea water and reduction of amenities."

In 1982, Report and Studies No. 16 did not prescribe any particular methodology for effective site selection, stating merely that the selection of dumping sites should be made in such a way as to minimize interference with present and potential uses of the sea. Factors to be considered, include (1) physical considerations, such as surface waves, wind-driven surface currents, interior oceanic circulation, turbulent diffusion, shear induced diffusion, vertical mixing, and modeling of transport and mixing in the ocean, (2) sedimentology, and (3) biological considerations, such as fishing grounds and aquaculture sites, breeding and nursery grounds, migration routes, and areas of high productivity or other special interest.

Because a growing majority of people live within 50 miles of the coastline of the United States, there are numerous proscriptions against dumping at sea. Disposal of trash in the ocean was outlawed by the United States Supreme Court in 1931; ocean dumping of industrial waste was prohibited by United States law in 1988; and the Ocean Dumping Ban Act of 1988 mandated the cessation of all sewage sludge dumping at sea by 1992. As a consequence of these and other legislative acts, land fills are rapidly filling up and are being closed by the Environmental Protection Agency.

Previous waste dumping at sea occurred within the Continental Shelf, generally in water depths less than 300 meters. Reconsideration and possible changes of current laws affecting dumping at sea may be warranted if utilization of the abyssal depths of the world's oceans can be demonstrated to be a feasible alternative option to the waste disposal at sea issue. This concept was examined at a Woods Hole Institute workshop, approximately a decade following the IMCO report. The document containing that workshop's conclusions and recommendations, "An Abyssal Ocean Option for Waste Management", Report of a Workshop held at The Woods Hole Oceanographic Institution, 7–10 Jan. 1991, is incorporated by reference herein for purposes of demonstrating the continuing and unmet need for tractable, viable approaches to the waste disposal problem.

Although comprising a very large area, there is, unfortunately, a paucity of knowledge concerning these abyssal sea floor regions, and requisite policy decisions for a desirable future are critically dependent upon such knowledge. At the 1991 Woods Hole meeting, a participant, Charles D. Hollister, proposed a site selection method involving suitability criteria, weighted attributes, and a geographic filter overlay system of translucent maps at the largest scale possible. Each individual attribute is geographically mapped and shaded (weighted) according to its relative importance, i.e. no shading (transparent) for most desired attributes, levels of varying transmittance for somewhat desired attributes, and opaque for least desired attributes. All attributes are mapped to the same scale. The resulting area when all the overlays are superimposed and illuminated from the underside would be a scene of varying transmittance. Those portions of the mapped and displayed scene featuring the least attenuation of the underside illumination (i.e. brightest region, highest transmittance) correspond to the most desired disposal sites and would be considered for more thorough data collection and analysis. Conversely, the darker and opaque regions of the mapped scene correspond to less desirable or as exclusion regions. The primitive analog nature of this technique presents numerous difficulties, for example:

- accurate registration of each individual overlay map when superimposed upon the set of overlay maps
- the limited dynamic range available for shading (weighting) each individual attribute map
- the uniformity of shading within a specific area of constant weighted value
- varying the shading of each map (i.e. each factor) easily and quickly to permit rapid interactive analysis by the user
- producing tens to hundreds of maps with precision fiducial markings
- physical handling of the many large scale maps needed to adequately depict the world's abyssal sea floor
- limits to the size and resolution of individual cells constituting the region under consideration The aforementioned difficulties are resolved with the present invention.

SUMMARY OF THE INVENTION

Expediting and diminishing the daunting task of gaining and manipulating a vast, diverse amount of data necessary to make meaningful decisions regarding the selection of candidate abyssal sea floor sites for the disposal of waste to a tractable endeavor can be accomplished by utilizing a computer-related method and apparatus entailing use of existing, albeit, limited data, winnowing possible disposal sites to a tractable number, and focusing data collection efforts on those candidate sites. Therefore, an object of the present invention is to provide a quantitative, reproducible method and apparatus for the detailed mapping and visual depiction, with the aid of a digital computer and database structures therein, of the graded, ranked features of a uniquely-referenced, relatively small area, district, or locality (i.e. cell), such mapping and displaying of a set of such cells defining a plane surface or surface of a solid, accompanying, existing, or occurring with an imagined or projected sequence of events, especially any of several detailed plans or possibilities. Another object of the present invention is to provide for timely, dynamic addition of newly acquired data or modification of existing data, both responsive to user control, while the sequence of steps constituting the method is in progress, thereby permitting both the refinement of the precision and accuracy of the site selection process and the generation of a myriad of scenarios. A further object of the present invention is to provide a quantitative, reproducible method and apparatus for optimization of site selection under complex scenarios during the evaluation of candidate sites for waste disposal on the abyssal sea floor by combining, scoring and mapping a diverse set of pre-defined factors, each factor comprising a set of predefined, weighted attributes, and, according to certain criteria, displaying that mapping of graded, ranked attributes in an informative, illustrative manner involving complex scenarios. Another object of this invention is to implement the apparatus and method at very modest cost, consistent with obtaining useful results in a reasonable amount of time. To minimize labor and equipment costs, the method and apparatus utilizes readily available data and commercially available components, namely, a personal computer and commercial spreadsheet and graphics software.

BRIEF DESCRIPTION OF THE DRAWINGS

FIG. 3 is an exemplary illustration of a portion of a typical factor weighting table used in one embodiment of the topography method and apparatus in accordance with the principles of the present invention.

FIG. 4 is an exemplary illustration of a portion of a typical factor scoring table used in one embodiment of the topography method and apparatus in accordance with the principles of the present invention.

FIG. 5 is a simplified exemplary "empty", but initialized, map of the Gulf of Mexico depicting locations of all active 1° (degree) latitude×1° (degree) longitude cells utilized in the topography method and apparatus in accordance with the principles of the present invention. The geo-referenced map of all cells is populated with all factors.

FIG. 6 is an exemplary illustration of a portion of a typical geo-referenced database array and score computation worksheet for the Gulf of Mexico featuring computed scores and lookup table for the continuous-value factor of distance in accordance with the principles of the present invention.

FIG. 7 is an exemplary illustration of a "filled", two-dimensional concomitant scenario topography map for the Gulf of Mexico featuring white cells corresponding to water areas acceptable for consideration, light gray cells corresponding to water areas proscribed from consideration, and dark cells corresponding to land. The thirteen cells featuring positive scores fulfill the criteria for the particular scenario under consideration.

FIG. 12 is a tabulation showing the factor weighting table (shown partially in FIG. 3) for the three abyssal plain waste disposal scenarios, namely, isolation of waste, dispersal of waste, and logistics from port of egress to disposal site.

DESCRIPTION OF THE PREFERRED EMBODIMENT(S)

Figure 1:
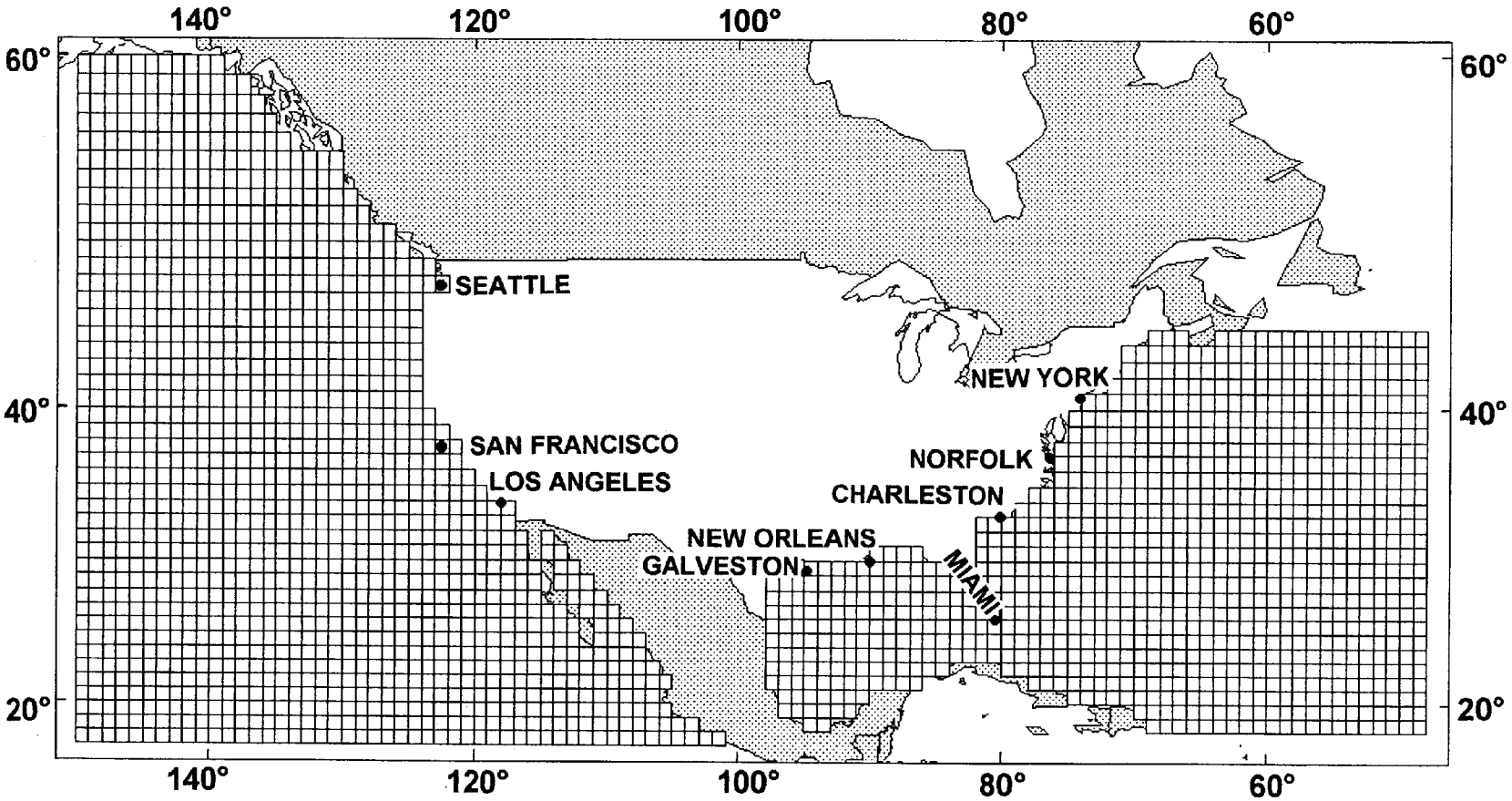
FIG. 1 is a simplified map of the continental United States and adjacent ocean areas visually depicting locations of all active 1° (degree) latitude×1° (degree) longitude uniquely-referenced, uniform, small areas (i.e. cells) utilized in the topography method and apparatus in accordance with the principles of the present invention. In this example, the uniquely-referenced cells are referenced according to geographical coordinates, that is, the cells are geo-referenced. Each cell is populated with all factors. It is an "empty", but initialized, version of the "filled" maps shown in FIG. 9, FIG. 10, and FIG. 11. Potential ports of egress for the shipment and subsequent disposal of waste are shown, including New York, New Orleans, and Los Angeles.

Although applicable to any planar region or surface of a solid (e.g. surface of the brain or eye when contemplating laser surgery), the present invention is particularly useful when practiced with geographical regions (e.g. sea floor of the earth's oceans when contemplating waste disposal). Although capable of being implemented on any commercially available general purpose computer, the present invention is most easily and economically practiced when configured within a personal computer with its typical associated keyboard, RAM, CPU, disk drive, monitor screen and graphics-capable printer. Appropriate configuration of the computer, in accordance with the present invention, is constructed from commercially available compatible spreadsheet and graphics software. Assembly and configuration of the computer system is readily performed by those skilled in the art. In the preferred embodiment, requisite input data is entered into the computer with a conventional keyboard, or the like; input and processed data is stored in either computer RAM or a data storage medium such as a disk drive, or the like; input data is processed in the computer CPU; and the resultant product of the present invention is visually depicted on a computer monitor screen, a graphs printer, or the like. When using this particular configuration, operation of the present invention is user friendly, extremely flexible and wholly interactive, permitting multivariate scenario generation, involving and linking together uniquely-referenced regions and a wide and varying range of factors into a concomitant scenario topographical product, such product expediting subsequent analysis and decision making commonly required in the resolution of complex issues involving a surface or site.

The foundation of the method of the present invention is the initial selection of a region of interest and the partitioning of that region into uniquely-referenced, uniform small areas, i.e. cells. Once defined, the size, extent and unique referencing of the partitioned cells are not further varied. Subsequent to definition of cells, a Factor-Weighting Table, a Factor-Category Scoring Table, a Weighting/Scoring Worksheet, and a Database Array and Score Computation Worksheet are configured on various database structures and worksheet structures defined in memory within the computer and used in conjunction with appropriate graphics software to produce two-dimensional and three-dimensional surface topography concomitant with complex, multivariate scenarios. In the preferred embodiment, the Factor-Weighting Table includes at least one join field which links the Factor-Category Scoring Table thereto; These tables are interrelated, and in an appropriate configuration could be combined into a single table. In the preferred embodiment, all tables and worksheets are stored and manipulated in the memory circuitry and configuration of a single personal computer.

Processing and transformation of diverse geophysical, economic, and political input data comprising both numbers and symbols into a combined, mapped display further entails use of a set of procedural rules. Such rules are typically simple and straightforward, readily determined and implemented by those skilled in the art.

The method and apparatus of the present invention is best comprehended by means of detailed description of several actual examples of concomitant scenario topography for the Gulf of Mexico (GOM), Western North Atlantic (WNA), and Eastern North Pacific (ENP) regions. In these examples, ports of egress include New Orleans, New York, and Los Angeles.

EXAMPLE 1

Waste Isolation and Containment

The initial step entails the determination and establishment of a set of procedural rules. This step is relatively common for many scientific, analytic, or production endeavors and should not pose any difficulty for those skilled in the art. The basic rules for Factor-Weighting and Category-Scoring are summarized in Table 1, Procedural Rules.

TABLE 1

Procedural Rules For GOM, WNA, and ENP Regions

The sum of "weight %" must=100.

Under each criterion, "total weight %" is the sum of all included factor weights.

Exclusionary factors are "excluded" (factor is activated) or "included" (factor inactive).

Excluded factors carry no weight %.

To treat a scorable factor as exclusionary, it must be assigned a very low weight % (e.g. 0.001 %), a factor-category score of 1 for the included condition, and a large negative score (e.g. −10e7) for the excluded condition.

Distance weightings apply individually to each area (WNA, GOM, ENP) and associated ports. Within each area, one or more ports may be weighted, giving a combination score for the cells ≦1000 nautical miles (nm) from all included ports.

Valid "Category scores" must range from 1.0 to 5.0 (1.0 is least desirable, 5.0 is most desirable).

Individual factor-categories may be excluded by assigning large negative numbers (e.g. −1000).

Factor weighting is normalized as weight percent, normalized factor weight=100(weight/weight sum)

To compute category factors, weighted factor score=(normalized factor weight)×(category score)

For continuous-range (distance) factors, weighted factor score=0.01×(normalized factor weight)

For exclusion factors, weighted factor score=IF (factor excluded by "e" in factor weight column) is TRUE, then return (−1000)
FALSE, then return (0)

Scoring for continuous-value (distance) is calculated from, distance weighted-score=IF (grid cell distance>1000) is
TRUE, then return (−1000)
FALSE, then return ((factor weighting)×((((1000-grid cell distance)/1000)4)+1))

The final geo-referenced grid-cell score is, grid-cell score=(SUM(weighted factor scores)+ABS.VAL.(SUM(weighted factor scores)))/2 where ABS.VAL. is the absolute value of the quantity

Converting exclusion factors and excluded categories to a normalized score, for example, grid-cell % score=12.5×((grid-cell score-1)+ABS.VAL.(grid-cell score-1))

In FIG. 1, a selected ocean area contiguous to the coastline of the continental United States has been partitioned into 1° (degree) cells, i.e. uniquely-referenced, uniform small areas. This embodiment of the present invention is concerned with the topographical depiction of the selection, grading, and ranking of attributes or properties possessed by each cell; It is presumed those properties are homogeneous within a particular cell. For simplicity, the area of interest for possible waste disposal sites has been divided into three regions, Western North Atlantic (WNA), Gulf of Mexico (GOM), and Eastern North Pacific (ENP). This in no way affects the method of the present invention; the present invention can be practiced as a single, large area or a sub-division of that area into regions.

Figure 2:
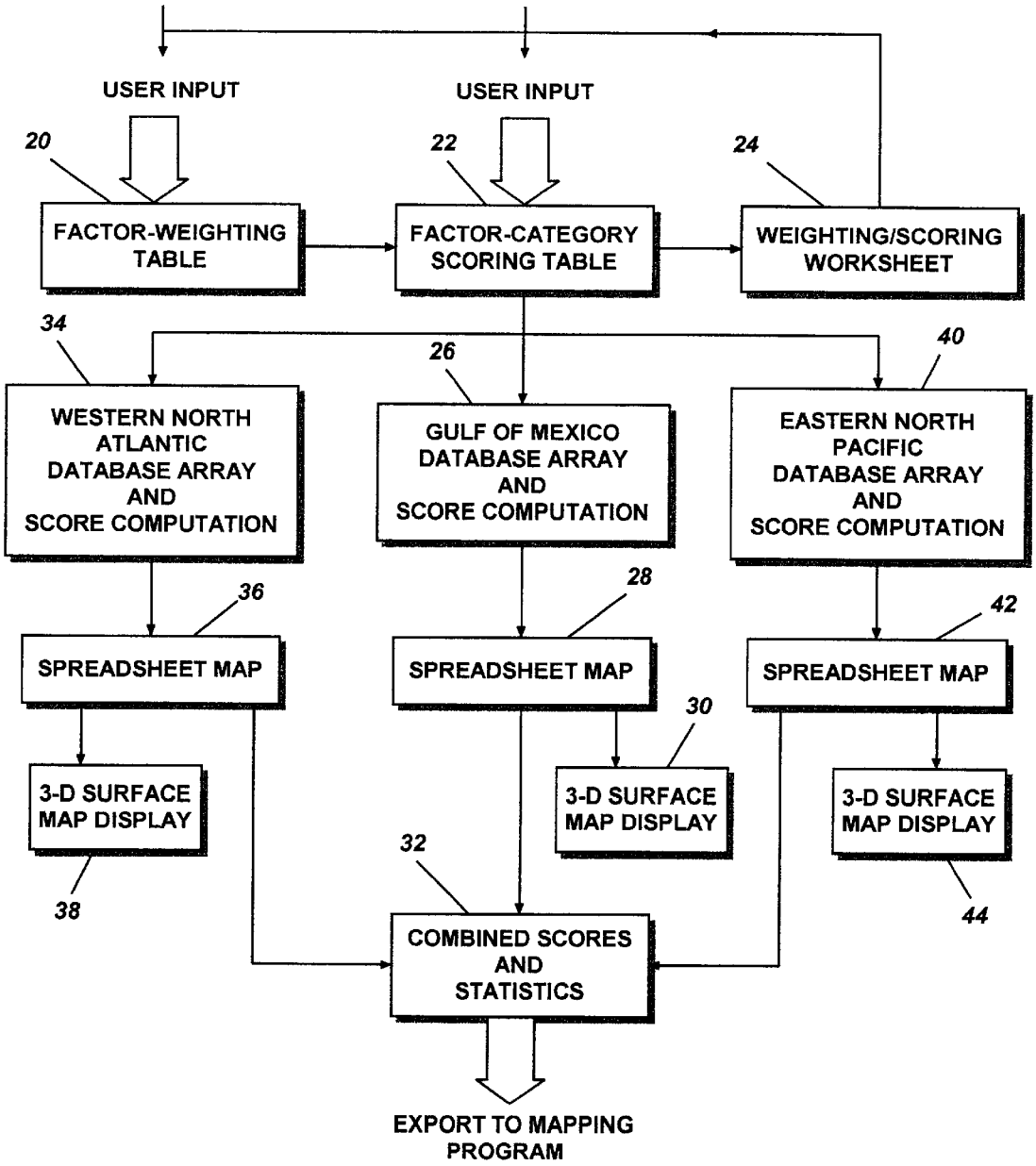
FIG. 2 is a simplified block diagram illustrating one embodiment of the topography method and apparatus in accordance with the principles of the present invention.

The sequence of steps constituting the method in accordance with the present invention is depicted in FIG. 2. Using a personal computer and spreadsheet software, Factor-Weighting Table 20 is constructed for receiving, arranging, storing, manipulating, and conveying data to Factor-Category Scoring Table 22. Factor-Weighting Table 20 and Factor-Category Scoring Table 22 are related to each other by at least one join field. Factor-Weighting Table 20 is "open-ended" in the sense that all the variables stored therein may be modified (including adding new variables and changing or deleting existing variables) responsively at any time during use of the present invention. A portion of the contents and structure of Factor-Weighting Table 20 appears in FIG. 3. Here the table comprises six lists, including criteria concomitant with selected scenarios, those factors associated with each criterion, an assigned weight for each factor, and normalized factor weight. From left to right in FIG. 3, the leftmost tabulation contains a unique alphabetic index identifier for each Criterion. Adjacent, and to the immediate right of this identifier, is a tabulation of each Criterion. Example Criteria include "Anthropogenic", "Geologic"and "Oceanographic". Adjacent, and to the immediate right of the Criterion tabulation is a list providing a unique numerical index identifier for each of the factors. The factors are listed adjacent and immediate to the right of the numerical index identifier list. Although not wholly shown in FIG. 3, in this particular scenario there are a total of 41 factors affecting the decision of where best to dump and isolate waste in the sea. Example factors include "HITS 1° ship density" (Historical Temporal Shipping database for one degree square cells) and "Max. slope, °/5'×5' square (maximum slope in degrees in a 5' (minute) square cell). The various factors are partitioned into three groups: (1) quantitative factors which can be considered "scorable", i.e. changeable at the option of the user, are assigned an inclusive, numeric index identifier between 1–99, (2) factors which can be considered "exclusion", i.e. factors whose nature is sufficient to proscribe selection of any cell featuring that factor, are assigned an inclusive, numeric index identifier between 101–199, and finally, (3) factors which can be considered "fixed score", i.e. factors not subject to environmental variability, such as the distance between a seaport and a cell, are assigned an inclusive, numeric index identifier between 201–299. These index identifier numbers are not included in the scoring mechanism.

Adjacent, and to the immediate right of the factor tabulation is a list of associated weights for each factor. Weights may comprise either numerical or alphabetical symbol values. For all "exclusion" factors, the weight is defined to be the symbol "e"; for all "fixed score" factors, the weight is defined to be the integer, "0"; for all "scorable" factors, the weight is determined by the user and can be any positive integer. For example, the designated weight for the factor, "Layer 6 bottom current speed" is 9. This latter weight determination by the user reflects the user's perception of a ranking of the relative importance of the "scorable" factors. This is the critical column list providing simple, rapid, dynamic interaction by the user.

Finally, the extreme rightmost list tabulates the normalized weight of the various factors, expressed as a percent of the total weight sum,
i.e. total normalized sum=100.00. For example, the normalized factor weight for the factor, "Layer 6 bottom current speed" is 9.00 %.

As shown in FIG. 2, Factor-Category Scoring Table 22 receives data from Factor-Weighting Table 20. This linked data between the two tables comprises tabulations from three join fields: (1) a unique numerical index identifier for each of the factors, i.e. 1–299, (2) the factor associated with that identifier, and (3) the normalized weight factor associated with each factor. A portion of these three lists, plus four additional lists not linked from Factor-Weighting Table 20, are illustrated as a factor category scoring table in FIG. 4.

Leftmost in FIG. 4 is the previously described list providing a unique numerical index identifier for each of the factors (e.g. 1–299). Adjacent and immediately to the right of the numerical index identifier list is the associated list of factors, one factor for each identifier number. Adjacent and immediately to the right of the list of factors is the associated normalized factor weight list, one normalized factor weight for each factor. These three aforementioned tabulations are the join fields also appearing in Factor-Weighting Table 20, FIG. 3.

An important distinction between Factor-Weighting Table 20, FIG. 2 and FIG. 3 and Factor-Category Scoring Table 22, FIG. 2 and FIG. 4 is the now-displayed presence of a quantitative set of ranged values, or categories (bins), associated with and listed as a subset directly beneath each "scorable" factor. These category bins are used to partition the exhaustive set of expected values for the factor variable, thereby improving the resolution and accuracy of the method. For example, factor number 21, "Layer 6 bottom current speed" has associated with it a real variable, i.e. measure of speed, whose value may appear exclusively in one of six possible category bins, (1) 0.0–0.25 centimeters/second (cm/sec), (2) 0.25–0.5 cm/sec, (3) 0.5–1.0 cm/sec, (4) 1.0–2.0 cm/sec, (5) 2.0–4.0 cm/sec, and finally (6)

4.0–8.0 cm/sec. The number and extent of the boundaries of these category bins, i.e. sets of ranged values or categories, are determined and generated on the basis of scientific research experience and judgment.

Associated with each category (range value bin) in FIG. 4, is an assigned value related to the highest expected magnitude for the particular associated category. This number is tabulated adjacent and immediately to the right of the normalized factor weight list. Used primarily for worksheet bookkeeping purposes, this tabulation is not used in the subsequent scoring.

Adjacent and immediately to the right of the aforementioned assigned value list is the associated tabulation of Category Scores. Similar in nature to the weight list of Factor-Weighting Table 20, FIG. 2 and FIG. 3, the Category Scores list provides for ranking interaction by the user. Based upon individual experience and judgment, the user of the present invention can rank each category as to desirability by assigning a real, positive number between 1.0 and 5.0, wherein a ranking of 5.0 designates the most desirable category value and, conversely, a ranking of 1.0 designates the least desirable category value. If, in the user's judgment, the category value is deemed unacceptable, assigning a large negative integer, i.e. −1000, will produce an exclusion from further consideration of all cells possessing that category value.

The final and rightmost list in Factor-Category Scoring Table 22, FIG. 2 and FIG. 4 is a tabulation of the Weighted Factor Scores, which is the multiplied product of "% factor weight"/100 and "category score" for each category ("Weighted Factor Score"=("% Factor Weight"/100)33 "Category Score"). For example, in the case of "Layer 6 bottom current speed", the Weighted Factor Score for the six category bins, 0.0–0.25 cm/sec, 0.25–0.5 cm/sec, 0.5–1.0 cm/sec, 1.0–2.0 cm/sec, 2.0–4.0 cm/sec, and 4.0–8.0 cm/sec is 0.45, 0.40, 0.36, 0.27, 0.18, and 0.09, respectively.

In the method of the present invention, "exclusion" factors, e.g. Bahama Platform, will have a symbol "E" appearing in the value list; this symbol value is automatically scored as −1000 in the Weighted Factor Score list. In similar manner, "Fixed score" factors, e.g. $WNA_{13}$ New York, utilize a formula which returns a score of 0.0 in the Weighted Factor Score list.

Tabular data from Factor-Weighting Table 20, FIG. 2 and FIG. 3 are linked by means of conventional computer porting and internal data transfer circuitry to Factor-Category Scoring Table 22, FIG. 2 and FIG. 4, which, in turn, is linked in like manner to Weighting/Scoring Worksheet 24, FIG. 2. It is here where the user can rapidly and dynamically modify both "% factor weight" (i.e. normalized factor weight) and "Category Scores" values, FIG. 4. The user's new values are immediately linked back within the computer to both Factor-Weighting Table 20, FIG. 2 and FIG. 3 and Factor-Category Scoring Table 22, FIG. 2 and FIG. 4, forming a dynamic feedback loop which refreshes all appropriate data therein, with the objective of improving resolution and accuracy of the method or generating a myriad of environmentally affected scenarios.

The contents of Factor-Category Scoring Table 22, FIG. 2 and FIG. 4, are further linked within the computer to Gulf of Mexico Database Array and Score Computation 26, FIG. 2 and FIG. 6, Western North Atlantic Database Array and Score Computation 34, FIG. 2, and Eastern North Pacific Database Array and Score Computation 40, FIG. 2, where the data are processed and prepared for subsequent mapping and graphic display. In like manner of the tables and worksheet configurations mentioned hereinbefore, these array and score computation algorithms and configurations are stored and manipulated within the memory configuration of the personal computer. It should be noted that the single set of scored criteria data from the Factor-Category Scoring Table 22 is applied to all three geographical regions of interest.

Following being combined with a particular geographic coordinate system, the scored criteria data are prepared for mapping. By way of an example to clarify this important process, output data from Gulf of Mexico Database Array and Score Computation 26, FIG. 2 and FIG. 6 is linked forward to Gulf of Mexico Spreadsheet Map 28, FIG. 2. Prior to receiving data from Gulf of Mexico Database Array and Score Computation 26, FIG. 2 and FIG. 6, all cells for Gulf of Mexico Spreadsheet Map 28, FIG. 2 and FIG. 5, configured in computer memory, are empty of data, but have been initialized and are ready to receive data. FIG. 5 shows the empty matrix of cells representing the Gulf of Mexico in 1° cells. The ordinate is the latitude of the center of each cell; the abscissa is the longitude. Although shown here in abbreviated form, where the longitude extends from 80.5° W to 97.5° W and the latitude extends from 18.5° N to 30.5° N, the full-size matrix of cells representing the Gulf of Mexico features an additional border of 1° cells, extending from 79.5° W to 98.5° W and from 17.5° N to 31.5° N. Only cells initialized and uniquely identified by a number (in this example, 1–160) are active constituents of the map. Shaded cells and cells lacking such an identifying number represent either land mass or proscribed maritime areas, and, consequently, are excluded from any scoring calculations. In this Gulf of Mexico example, there are 160 active cells available to receive data.

The next step in the method of the present invention is to link the data from Factor-Category Scoring Table 22, FIG. 2 and FIG. 4, to the empty, initialized spreadsheet map. This step takes place in the Gulf of Mexico Database Array and Score Computation 26, FIG. 2 and FIG. 6.

This step is known as "geo-referencing the cells", where, for the first time, Category scoring data representing a particular multivariate scenario comprising environmental, economic, political and other variables are associated with a geographic coordinate system, forming a concomitant scenario topographical map.

A portion of the data involved in this geo-referencing step is shown in "Gulf of Mexico 1° Cell Weighted Factor-Scores and Cell Scores", FIG. 6. This figure illustrates three significant sets of data, (1) the scoring computations, (2) the array of factors, and (3) the distance look-up table.

The leftmost three columns tabulate the latitude, longitude, and numerical index identifier of each of the 160 cells, respectively. Adjacent to each cell identifier is the cell's associated numerical score (either zero or some positive value in the range, 1.0–5.0) and per-cent (%) score. The numerical score equals the factor row summation of the values for all the factors in the row corresponding to a particular cell. For example, the numerical score for cell numerical index #45 is 3.65, the result of a factor row summation which includes, 0.15, 0.14, and 0.449991. The acceptable score range extends from 1.0 to 5.0; all other values, including zero signify exclusion of that particular cell. Since the acceptable range is 1.0–5.0, the related % score is (score-1.0)/(5.0–1.0). For example, the normalized score for cell numerical index #45 is 66.25%.

The central portion of FIG. 6 shows a portion of the array of factors, with the factor index identification number (0–299) appearing as column headings. These column headings correspond to aforementioned factor index identification numbers and shown previously in FIG. 3 and FIG. 4. That is, scorable factors are indexed and identified in the range 1–99; exclusion factors are indexed and identified in the range 101–199; and fixed score factors are indexed and identified in the range 201–299. The factor index identification number zero (0) is reserved for testing purposes. Any negative number in this array of factors will designate the associated cell as excluded. Finally, in the rightmost column is a tabulation of the calculated Great Circle distance from the port of New Orleans to the center of each cell, e.g. for cell numerical index #45, the distance is 323.434 nautical miles (nm).

The result of these calculations is illustrated in the "filled" Gulf of Mexico Spreadsheet Map 28, FIG. 2 and FIG. 7. Here is the full matrix of cells representing and mapping the Gulf of Mexico, where the longitude extends from 79.5° W to 98.5° W and the latitude extends from 17.5° N to 31.5° N. All shaded cells are excluded. The darker shaded cells represent land mass (in this example, the land mass cell value is assigned to be −18); the lighter shaded cells represent proscribed ocean areas outside the region of interest (proscribed area cell values are assigned to be zero). Although not included in the immediate scoring process, these excluded cells must be assigned either a zero or negative number for subsequent visual depiction of the three dimensional (3-D) concomitant scenario topographic mapping of the ocean region of consideration, FIG. 8.

As graphically displayed in FIG. 7, of the 160 active candidate cells for the Gulf of Mexico region of interest, only those 13 cells featuring positive numbers (60, 60, 66, 66, 66, 69, 69, 58, 54, 67, 71, 71, and 58) satisfy the quantified criteria of Factor-Weighting Table 20 for the particular scenario concerning possible sites for waste disposal and isolation in the abyssal depths. The cell with geographical coordinates, 25.5 North and 93.5 West, corresponds to cell #45 and features a truncated value of 66, as shown previously in FIG. 6. Visual presentations of this type can be usefully applied to issues regarding waste disposal in the deep ocean abyssal plain.

Figure 8:
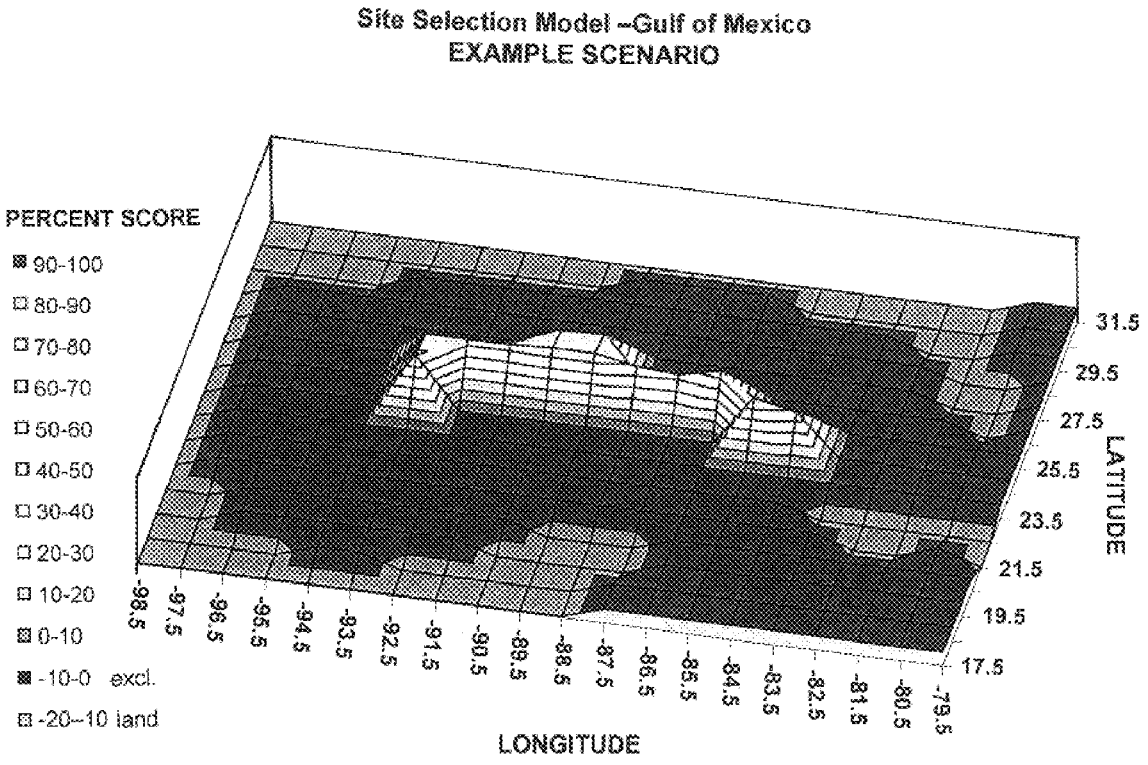
FIG. 8 is an exemplary illustration of a spreadsheet-generated three-dimensional concomitant scenario topography map for the Gulf of Mexico in accordance with the principles of the present invention.

Utilization of commercially available three-dimensional graphics software, Gulf of Mexico 3-D Map Display 30, FIG. 2 and FIG. 8 produces yet another and more easily comprehended topographical rendering of a scenario concerning acceptable abyssal plain sites for waste disposal and isolation. The 3-D visual depiction, FIG. 8, is the preferred means for illustrating the complex concomitant scenario topography associated with waste disposal issues.

Besides providing mapping data to Gulf of Mexico 3-D Map Display 30, FIG. 2 and FIG. 8, the "filled" Gulf of Mexico Spreadsheet Map 28, FIG. 2 and FIG. 7 further provides data to Combined Scores and Statistics 32 for subsequent linkage to a commercially available mapping program which can visually depict a single concomitant topography map for a plurality of regions.

In a manner similar to Gulf of Mexico Database Array and Score Computation 26, FIG. 2 and FIG. 6, Western North Atlantic Database Array and Score Computation 34, FIG. 2 processes input data, links the processed data to Western North Atlantic Spreadsheet Map 36, which links to Western North Atlantic 3-D Surface Map Display 38, FIG. 2 and Combined Scores and Statistics 32, FIG. 2.

Likewise, in a manner similar to Gulf of Mexico Database Array and Score Computation 26, FIG. 2 and FIG. 6, Eastern North Pacific Database Array and Score Computation 40, FIG. 2 processes input data, links the processed data to Eastern North Pacific Spreadsheet Map 42, which links to Eastern North Pacific 3-D Surface Map Display 44, FIG. 2 and Combined Scores and Statistics 32, FIG. 2.

Figure 9:
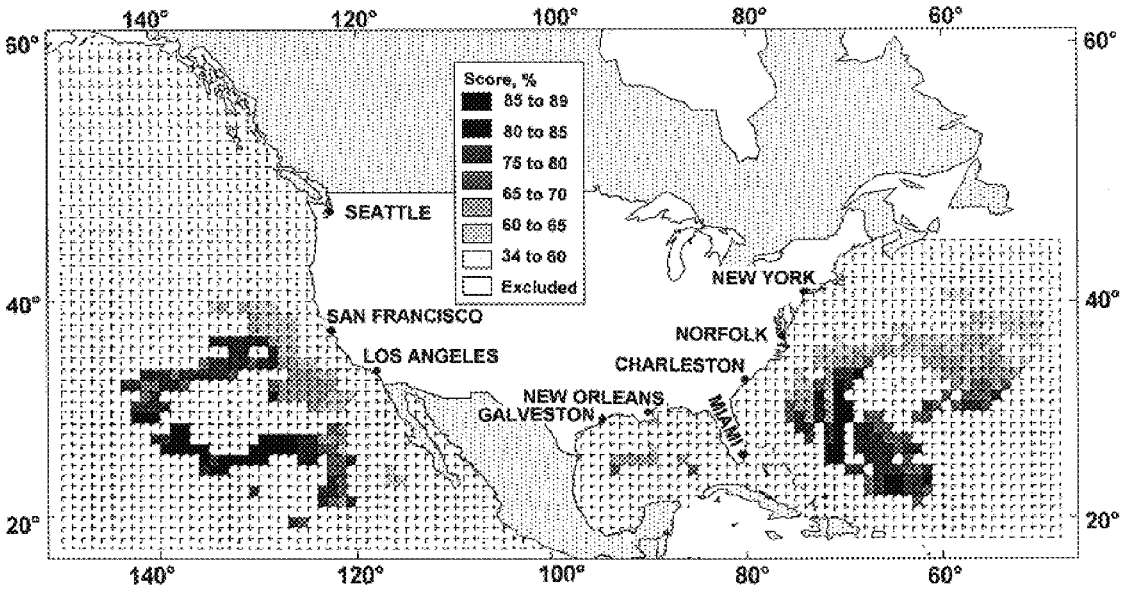
FIG. 9 is an exemplary illustration of a simplified concomitant scenario topography map of the continental United States and adjacent ocean areas depicting locations of all active 1° (degree) latitude×1° (degree) longitude cells utilized in the topography method and apparatus in accordance with the principles of the present invention. This particular scenario is designed for isolation and containment of waste and utilizes procedural rules summarized in Table 1 and data tabulated in FIG. 12.

The combined concomitant scenario topography for waste isolation in three separate regions, Gulf of Mexico, Western North Atlantic, and Eastern North Pacific, is processed and assembled in Combined Scores and Statistics 32, FIG. 2 and shown in FIG. 9. Cell desirability scores therefrom for isolation and containment of waste in the abyssal depths are shaded and vary from 34% to 89%. Unshaded cells denote areas where waste disposal in the abyssal depths is either undesirable or prohibited (excluded).

EXAMPLE 2

Waste Dispersal

Figure 10:
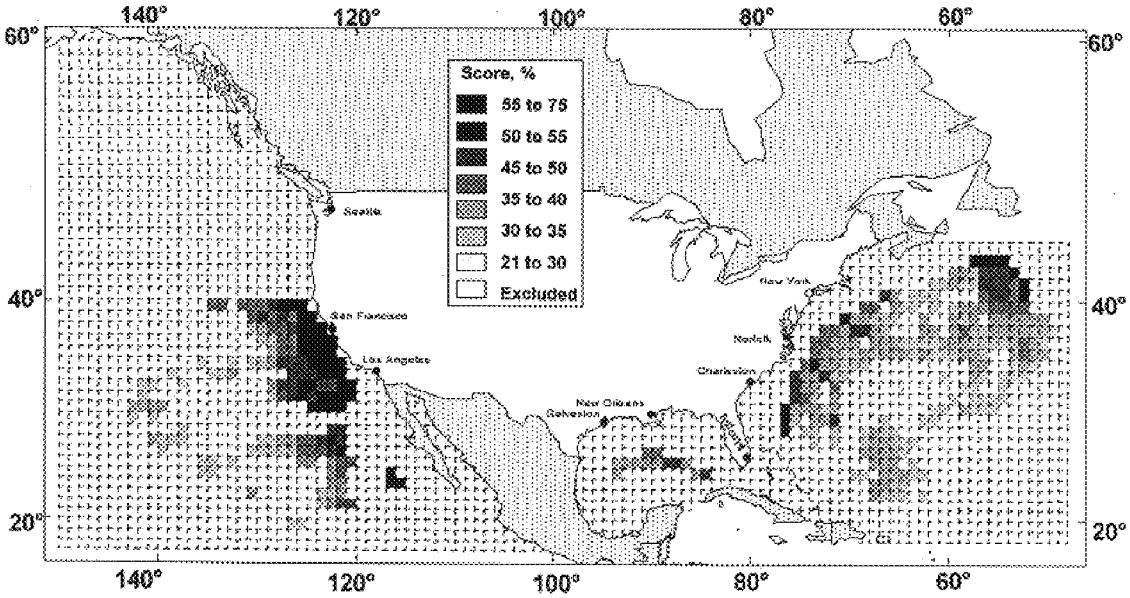
FIG. 10 is an exemplary illustration of a simplified concomitant scenario topography map of the continental United States and adjacent ocean areas depicting locations of all active 1° (degree) latitude×1° (degree) longitude cells utilized in the topography method and apparatus in accordance with the principles of the present invention. This particular scenario is designed for optimum dispersal of waste and utilizes procedural rules summarized in Table 1 and data tabulated in FIG. 12.

Using the same rationale and regions in Example 1, a modest change in weighting and scoring effected at Weighting/Scoring Worksheet 24 can quickly and easily produce a scenario for waste disposal and subsequent dispersion instead of containment. The combined map for waste dispersion in the Gulf of Mexico, Western North Atlantic, and Eastern North Pacific regions is shown in FIG. 10. Cell desirability scores for disposal and subsequent dispersion of waste in the abyssal depths are shaded and vary from 21 % to 75%.

EXAMPLE 3

Logistics

Figure 11:
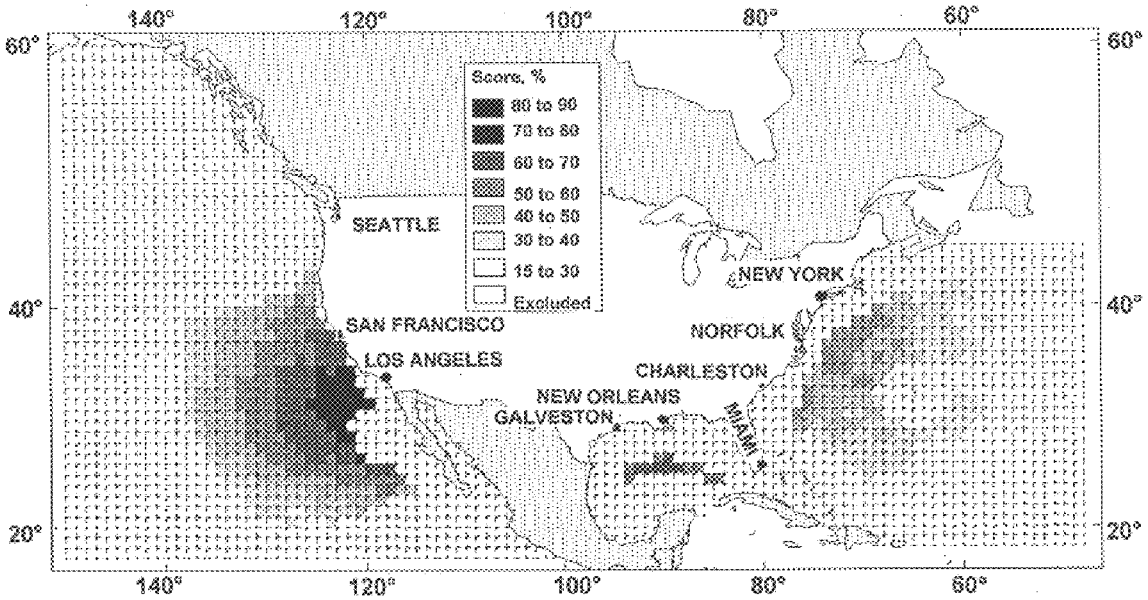
FIG. 11 is an exemplary illustration of a simplified concomitant scenario topography map of the continental United States and adjacent ocean areas depicting locations of all active 1° (degree) latitude×1° (degree) longitude cells utilized in the topography method and apparatus in accordance with the principles of the present invention. This particular scenario is a logistics scenario for waste disposal operations from the ports of New York, New Orleans, and Los Angeles and utilizes procedural rules summarized in Table 1 and data tabulated in FIG. 12.

A further example of the utility of the present invention explores the issue of logistics of waste disposal from major United States ports. In this example the ports are New York, New Orleans, and Los Angeles for the regions Western North Atlantic, Gulf of Mexico, and Eastern North Pacific, respectively. The combined scenario map for logistics of waste disposal in the Gulf of Mexico, Western North Atlantic, and Eastern North Pacific regions is shown in FIG. 11. Cell desirability scores for logistics relevant to waste disposal in the abyssal depths are shaded and vary from 15% to 90%.

FIG. 12 depicts the factor weighting table used to generate the concomitant scenario topography for the isolation scenario illustrated in FIG. 9, the dispersal scenario illustrated in FIG. 10, and the logistics scenario illustrated in FIG. 11.

Although only a few exemplary embodiments of the invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of concomitant scenario topography with the aid of a digital computer for mapping and visually depicting the features of a uniquely-referenced, relatively small area, said method comprising the steps of:

(a) partitioning at least one region of consideration for said topography into a plurality of uniquely-referenced, uniform, small areas, said region defined in terms of plane surfaces and surfaces of a solid;

(b) providing a set of procedural rules applicable to each said region, said rules including provision for determining exclusion factors, excluded categories, distance weighting, category scores, factor weighting, uniquely-referenced uniform, small area scores, and conversion of said exclusion factors and said excluded categories to normalized scores;

(c) providing said computer with a first interrelated table for said topography, said first table having first table data according to said set of procedural rules therein, having at least one join field, including at least one criterion datum, each of said criterion datum having at least one factor datum associated therewith, each said factor datum identified as of at least one type, each said factor datum having a weight datum and a normalized factor weight datum associated therewith;

(d) providing said computer with a second interrelated table for said topography including at least one join field linking said second table to said first table, linked to receive said first table data from said first table, said second table having second table data according to said set of procedural rules therein, including said factor datum, each said factor datum having said normalized factor weight datum associated therewith, each of said factor datum having at least one category range datum associated therewith, each of said category range datum having a value datum, a category score datum, and a weighted factor score datum associated therewith;

(e) providing said computer with a separate table array and score computation worksheet for each said region, linked to receive said second table data from said second table, thereupon combining said second table data with unique referencing for each of said plurality of uniquely-referenced, uniform, small areas associated therewith, forming a separate topographical dataset for each said region, each said topographical dataset including distance-related logistics data and scenario determined scoring of said second table data related to each of said plurality of uniquely-referenced, uniform, small areas associated therewith;

(f) providing said computer with a separate two-dimensional spreadsheet map and display for each said table array and score computation worksheet, linked to said table array and score computation worksheet and uniquely associated therewith, said two-dimensional map and display including dimensional referencing capability for said plurality of uniquely-referenced, uniform, small areas associated therewith;

(g) initializing each said two-dimensional spreadsheet map and display to receive data, said initializing including providing referencing for each of said plurality of uniquely-referenced, uniform, small areas associated with each said region associated with said table array and score computation worksheet, identifying all of said plurality of uniquely-referenced, uniform, small areas excluded from receiving data, and uniquely identifying all of said plurality of uniquely-referenced, uniform, small areas permitted and expected to receive data;

(h) mapping each said topographical dataset from each said table array and score computation worksheet onto each said two-dimensional spreadsheet map associated therewith; and (i) visually depicting each said two-dimensional spreadsheet map.

2. A method of concomitant scenario topography with the aid of a digital computer, as recited in claim 1, further comprising the steps of:

(a) providing said computer with a first worksheet for said topography, having first worksheet data therein, linked to receive said second table data from said second table and to convey first worksheet data to both said first table and said second table;

(b) dynamically modifying, responsive to user control and according to said set of procedural rules, within said first worksheet, said second table data linked from said second table into said first worksheet data; and (c) dynamically conveying, responsive to user control, said first worksheet data from said first worksheet to said first table and said second table.

3. A method of concomitant scenario topography with the aid of a digital computer, as recited in claim 2, further comprising the steps of:

(a) combining each said topographical dataset from each said two-dimensional spreadsheet map and display, forming a combined topographical dataset and determining statistics thereof;

(b) mapping said combined uniquely-referenced topographical dataset into a combined map; and (c) visually depicting, in a single depiction, said combined map, thereby producing concomitant scenario topography including all said regions of consideration.

4. A method of concomitant scenario topography with the aid of a digital computer, as recited in claim 3, further comprising the step of providing each said uniquely-referenced topographical dataset from each said two-dimensional map associated therewith to a separate three-dimensional concomitant scenario topographical map and display for each said region.

5. A method of concomitant scenario topography with the aid of a digital computer, as recited in claim 4, wherein referencing of said plurality of uniquely-referenced, uniform, small areas utilizes geographical coordinates for a portion of the earth's surface.

6. A method of concomitant scenario topography with the aid of a digital computer, as recited in claim 1, wherein referencing of said plurality of uniquely-referenced, uniform, small areas utilizes geographical coordinates for a portion of the earth's surface.

7. A method of concomitant scenario topography with the aid of a digital computer, as recited in claim 2, further comprising the step of providing said uniquely-referenced dataset to a three-dimensional concomitant scenario topographical display for each said region.

8. A method of concomitant scenario topography with the aid of a digital computer, as recited in claim 1, wherein said first table and said second table are constituent components of a single table.

9. A method of concomitant scenario topography with the aid of a digital computer, comprising the steps of:

(a) partitioning at least one geographical region of consideration for said topography into a plurality of geographically-referenced, uniform, small areas of the earth's surface;

(b) providing a set of procedural rules applicable to each said region, said rules including provision for determining exclusion factors, excluded categories, distance weighting, category scores, factor weighting, category scores, geographically-referenced uniform, small area scores, and conversion of said exclusion factors and said excluded categories to normalized scores;

(c) providing said computer with an interrelated Factor-Weighting Table for said topography, said Factor-Weighting Table having Factor-Weighting data according to said set of procedural rules therein, having at least one join field, including at least one criterion datum, each of said criterion datum having at least one factor datum associated therewith, each said factor datum identified as of at least one type, including scorable, exclusion, and fixed score, each said factor datum having a weight datum and a normalized factor weight datum associated therewith;

(d) providing said computer with an interrelated Factor-Scoring Table for said topography including at least one join field linking said Factor-Scoring Table to said Factor-Weighting Table table, linked to receive said Factor-Weighting Table data from said Factor-Weighting Table, said Factor-Scoring Table having Factor-Scoring Table data according to said set of procedural rules therein, including said factor datum, each said factor datum having said normalized factor weight datum associated therewith, each of said factor datum having at least one category range datum associated therewith, each of said category range datum having a value datum, a category score datum, and a weighted factor score datum associated therewith;

(e) providing said computer with a Weighting/Scoring Worksheet for said topography, linked to receive said Factor-Scoring Table data from said Factor-Scoring Table and to transmit Weighting/Scoring Worksheet data to both said Factor-Weighting Table and said Factor-Scoring Table;

(f) dynamically modifying, responsive to user control and according to said set of procedural rules, within said Weighting/Scoring Worksheet, said Factor-Scoring Table data linked from said Factor-Scoring Table into said Weighting/Scoring Worksheet data;

(g) dynamically transmitting, responsive to user control, said Weighting/Scoring Worksheet data from said Weighting/Scoring Worksheet to said Factor-Weighting Table and said Factor-Scoring Table;

(h) providing said computer with a separate table array and score computation worksheet for each said region, linked to receive said Factor-Scoring Table data from said Factor-Scoring Table, thereupon combining and thereby geo-referencing said Factor-Scoring Table data with unique referencing for each of said plurality of geographically-referenced, uniform, small areas associated therewith, forming a separate topographical dataset for each said region, each said topographical dataset including distance-related logistics data and scenario determined scoring of said Factor-Scoring Table data related to each of said plurality of geographically-referenced, uniform, small areas associated therewith;

(i) providing said computer with a separate two-dimensional spreadsheet map and display for each said table array and score computation worksheet, linked to said table array and score computation worksheet and uniquely associated therewith, said two-dimensional map and display including dimensional referencing capability for said plurality of geographically-referenced, uniform, small areas associated therewith;

(j) initializing each said two-dimensional spreadsheet map and display to receive each said dataset associated therewith, said initializing including providing referencing for each of said plurality of geographically-referenced, uniform, small areas associated with each said region associated with said table array and score computation worksheet, identifying all of said plurality of geographically-referenced, uniform, small areas excluded from receiving said dataset, and uniquely identifying all of said plurality of geographically-referenced, uniform, small areas permitted and expected to receive said dataset;

(k) mapping and visually depicting each said topographical dataset from each said table array and score computation worksheet onto each two-dimensional spreadsheet map and display associated therewith;

(l) combining each said topographical dataset from each said two-dimensional spreadsheet map and display, forming a combined topographical dataset and computing statistics thereof;

(m) mapping said combined geographically-referenced topographical dataset into a combined map; and (n) visually depicting said combined map, thereby producing in a single depiction, concomitant scenario topography including all said geographical regions of consideration.

10. A method of concomitant scenario topography with the aid of a digital computer, as recited in claim 9, wherein said Factor-Weighting Table and said Factor-Scoring Table are constituent components of a single table.

11. A method of concomitant scenario topography with the aid of a digital computer, as recited in claim 9, wherein said Weighting/Scoring Worksheet and each said table array and score computation worksheet for each said region are constituent components of a single worksheet.

12. A computer-implemented method of selecting a site from among a plurality of sites within a spatial region, comprising the steps of:

(a) partitioning said spatial region into a plurality of discrete, non-overlapping, uniform portions;

(b) defining a database structure in a first segment of computer memory, said database structure having a plurality of cells, each one of said cells being uniquely referenced to one of said portions;

(c) determining a plurality of attributes for which all of said portions are to be assigned a raw score;

(d) setting a minimum and maximum score for each of said attributes;

(e) assigning a weight factor to each of said attributes;

(f) grading all of said cells for each of said attributes, thus creating, for all of said cells, said raw score for each of said attributes;

(g) entering said weight factors and said raw scores into corresponding cells of said database structure;

(h) converting, within each cell of said database structure, said entered raw scores and weight factors into a normalized sum total score corresponding to the sum of the normalized, factor weighted scores for each of said attributes;

(i) storing said normalized sum total scores for each of said cells in a second segment of computer memory, said normalized sum total scores for each said cell being linked, in said second segment of computer memory, with said corresponding portion of said spatial region; and (j) displaying said linked normalized sum total scores in said second segment of computer memory as a map of said partitioned spatial region, said map associating for each said portion of said partitioned region, a visual indication of said normalized sum total score for that portion.

13. A method according to claim 12, further comprising the steps of:

(a) defining a worksheet structure in a third segment of computer memory, said worksheet structure, interrelated to said database structure, having at least one join field linking said worksheet structure with said database structure;

(b) entering, responsive to user control, replacement weight factors and replacement raw scores into said worksheet structure; and (c) replacing said weight factors and said raw scores located in said database structure with said replacement weight factors and said replacement raw scores.

14. An apparatus for concomitant scenario topography with the aid of a digital computer for mapping and visually depicting the multivariate features of a uniquely-referenced, relatively small area, said apparatus comprising:

(a) a first interrelated table, responsive to user control, including visual depiction, configured in said computer such that said first table receives user input data and includes at least one join field, said first interrelated table having first interrelated table data therein, according to a set of procedural rules, said set of procedural rules applicable to at least one region of interest, each said region of interest partitioned into a plurality of uniquely-referenced, uniform, small areas, each said region defined in terms of plane surfaces and surfaces of a solid, said procedural rules including provision for determining exclusion factors, excluded categories, distance weighting, category scores, factor weighting, category scores, uniquely-referenced uniform, small area scores, and conversion of said exclusion factors and said excluded categories to normalized scores, said first table including at least one criterion datum, each of said criterion datum having at least one factor datum associated therewith, each said factor datum identified as of at least one type, each said factor datum having a weight datum and a normalized factor weight datum associated therewith;

(b) a second interrelated table, responsive to user control, including visual depiction, configured in said computer such that said second table receives user input data and includes at least one join field which links said first interrelated table to said second interrelated table, said second interrelated table having second interrelated table data therein, according to said set of procedural rules, including said factor datum, each said factor datum having said normalized factor weight datum associated therewith, each of said factor datum having at least one category range datum associated therewith, each of said category range datum having a value datum, a category score datum, and a weighted factor score datum associated therewith;

(c) a database array and score computation worksheet for each said region of interest, responsive to user control, including visual depiction, configured in said computer such that each said score computation worksheet includes at least one join field which links each said score computation worksheet to said second interrelated table, thereupon combining said second interrelated table data with unique referencing for each of said plurality of uniquely-referenced, uniform, small areas associated therewith, forming a separate concomitant scenario topographical dataset for each said region, each said topographical dataset including distance-related logistics data and scenario determined scoring of said second table data related to each of said plurality of uniquely-referenced, uniform, small areas associated therewith;

(d) a separate two-dimensional spreadsheet map for each said region, responsive to user control for visual depiction, configured in said computer such that each said separate two-dimensional spreadsheet map is uniquely and exclusively linked to one of each said database array and score computation worksheet, thereby uniquely associated therewith, to receive data therefrom, said two-dimensional map including dimensional referencing capability for said plurality of uniquely-referenced, uniform, small areas associated therewith, each said map initialized prior to receiving data, said initialization referencing each of said plurality of uniquely-referenced, uniform, small areas associated with each said region associated with said database array and score computation worksheet, identifying all of said plurality of uniquely-referenced, uniform, small areas excluded from receiving data, and uniquely identifying all of said plurality of uniquely-referenced, uniform, small areas permitted and expected to receive data, each said two-dimensional map further configured to provide visual depiction of said map.

15. An apparatus as recited in claim 14, further comprising:

(a) a weighting/scoring worksheet, for receiving, manipulating, storing, visually depicting, and conveying weighting/scoring worksheet data, responsive to user control, configured in said computer such that said weighting/scoring worksheet includes at least one join field which links said weighting/scoring worksheet to said first interrelated table and said second interrelated table, linked to convey said weighting/scoring worksheet data to said first interrelated table and said second interrelated table.

16. An apparatus as recited in claim 15, further comprising:

(a) a separate three-dimensional map for each said region, responsive to user control for visual depiction, configured in said computer such that each said separate three-dimensional map is uniquely and exclusively linked to one of each said two-dimensional spreadsheet map, thereby uniquely associated therewith, to receive data therefrom, said three-dimensional map including dimensional referencing capability for said plurality of uniquely-referenced, uniform, small areas associated therewith, each said three-dimensional map initialized prior to receiving data, said initialization including providing referencing for each of said plurality of uniquely-referenced, uniform, small areas associated with each said region associated with said two-dimensional spreadsheet map, identifying all of said plurality of uniquely-referenced, uniform, small areas excluded from receiving data, and uniquely identifying all of said plurality of uniquely-referenced, uniform, small areas permitted and expected to receive data, each said three-dimensional map further configured to provide visual depiction of said three-dimensional map.

17. An apparatus as recited in claim 16, further comprising:

(a) a combined scores and statistics worksheet, for receiving, manipulating, storing, and conveying each said topographical dataset, responsive to user control, configured in said computer such that said combined scores and statistics worksheet includes at least one join field which links said combined scores and statistics worksheet to each said two-dimensional spreadsheet map, receiving each said topographical dataset from each said two-dimensional spreadsheet map, forming a combined topographical dataset therefrom; and (b) a combined, uniquely-referenced topographical map, responsive to user control for visual depiction thereof, said combined map linked to said combined scores and statistics worksheet and receiving combined topographical dataset therefrom.

18. The concomitant scenario topography produced by the method of claim 1.

19. The concomitant scenario topography produced by the method of claim 9.

20. The selection of a site from among a plurality of sites within a spatial region by the method of claim 13.

* * * * *